(12) United States Patent  
Kobayashi et al.

(10) Patent No.: US 8,917,251 B2  
(45) Date of Patent: Dec. 23, 2014

(54) MOBILE ELECTRONIC DEVICE

(75) Inventors: Hiroki Kobayashi, Daito (JP); Hiroyuki Okamoto, Daito (JP)

(73) Assignee: KYOCERA Corporation, Kyoto (JP)

( * ) Notice: Subject to any disclaimer, the term of this patent is extended or adjusted under 35 U.S.C. 154(b) by 221 days.

(21) Appl. No.: 13/400,886

(22) Filed: Feb. 21, 2012

(65) Prior Publication Data

US 2012/0212437 A1 Aug. 23, 2012

(30) Foreign Application Priority Data

Feb. 21, 2011 (JP) ................... 2011-034291

(51) Int. Cl.
- *G06F 3/041* (2006.01)
- *G09G 5/00* (2006.01)
- *G06F 1/16* (2006.01)
- *G06F 3/0488* (2013.01)

(52) U.S. Cl.
CPC ............ *G06F 3/0418* (2013.01); *G06F 1/1647* (2013.01); *G06F 1/1624* (2013.01); *G06F 3/04886* (2013.01)
USPC .......................................... 345/173; 345/1.1

(58) Field of Classification Search
None
See application file for complete search history.

(56) References Cited

U.S. PATENT DOCUMENTS

2006/0211454 A1* 9/2006 Park et al. ................. 455/566
2010/0302179 A1* 12/2010 Ahn et al. .................. 345/173
2010/0304793 A1* 12/2010 Kim et al. .................. 455/566

FOREIGN PATENT DOCUMENTS

| JP | 09-305262 | 11/1997 |
| JP | 2006-87108 A | 3/2006 |
| JP | 2009-163500 A | 7/2009 |

OTHER PUBLICATIONS

Non-Final Office Action dated Jul. 29, 2014 issued by the Japanese Patent Office for Japanese Patent Application No. 2011-034291.

* cited by examiner

*Primary Examiner* — Nicholas Lee

(57) ABSTRACT

A mobile electronic device and method for operating a mobile electronic device are disclosed. A first detected input is detected on the first display module. A second detected input is detected on the second display module. The first detected input is set to an invalid input, when the second detected input is detected during a device configuration of the mobile electronic device, the device configuration comprising at least a portion of a first display module being exposed, and at least a portion of a second display module being exposed. The second detected input is set to an invalid input, when the first detected input is detected in the device configuration.

21 Claims, 7 Drawing Sheets

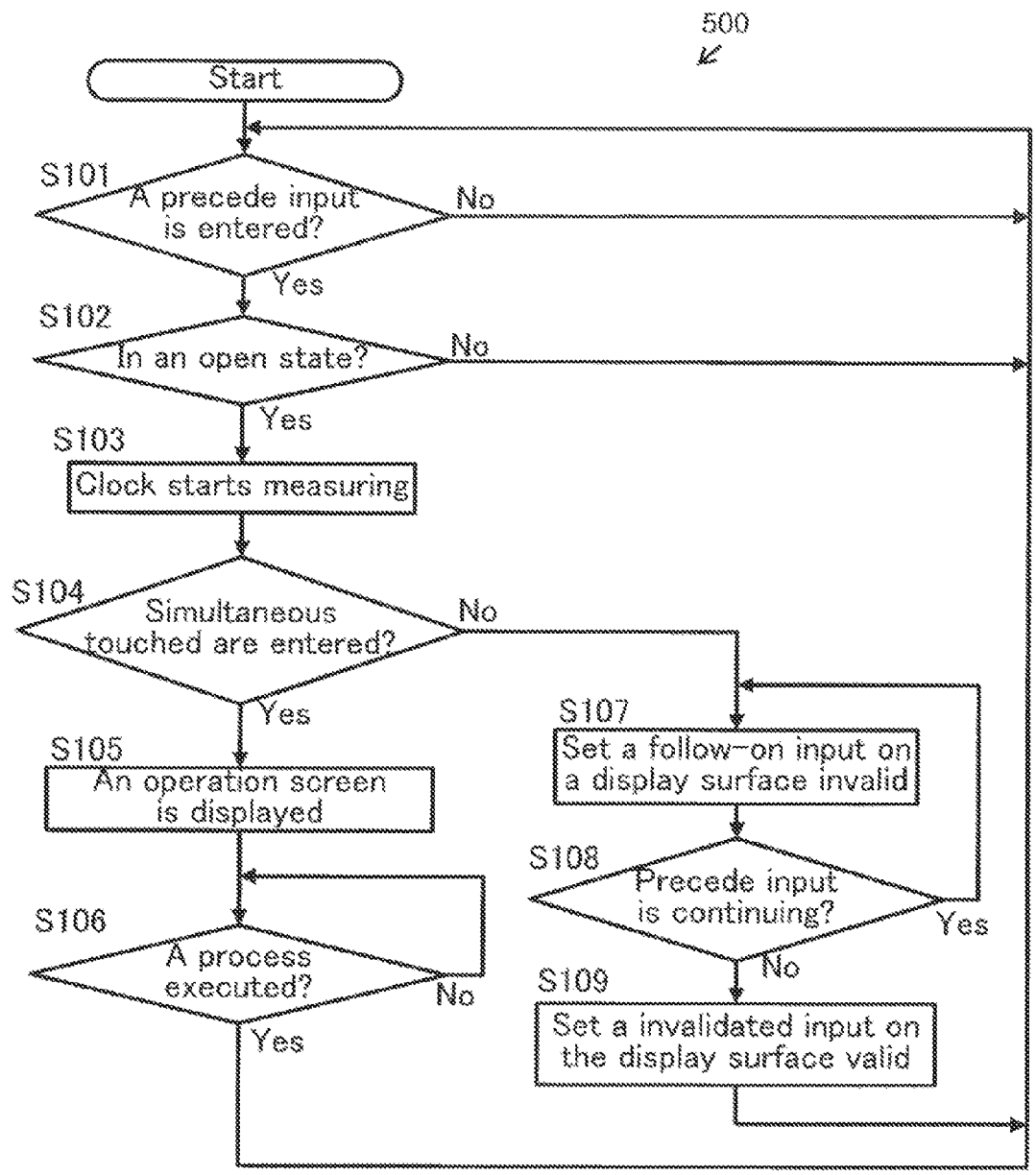

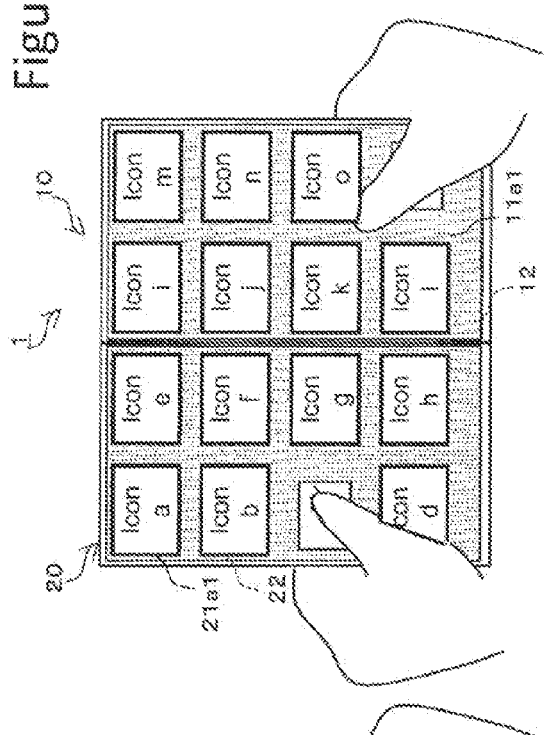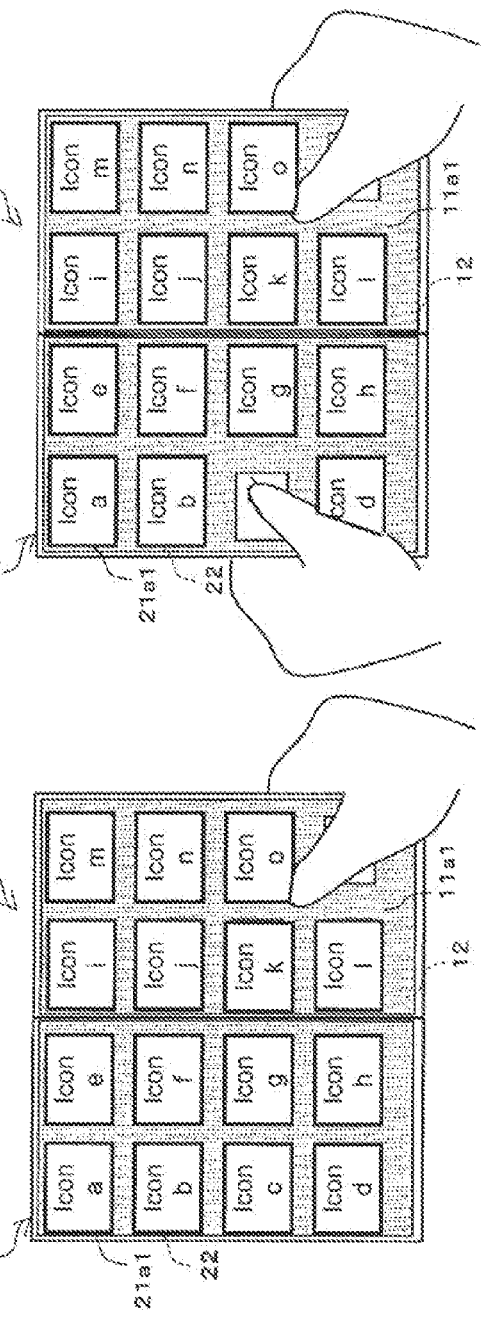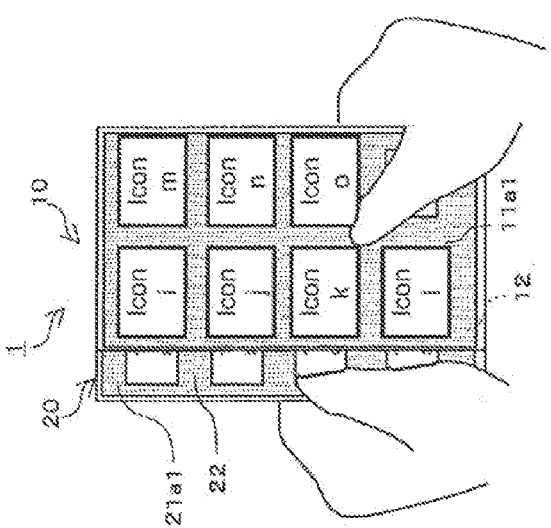

MOBILE ELECTRONIC DEVICE

CROSS-REFERENCE TO RELATED APPLICATION

The present application claims priority under 35 U.S.C. §119 to Japanese Patent Application No. 2011-034291, filed on Feb. 21, 2011, entitled "MOBILE TERMINAL DEVICE". The content of which is incorporated by reference herein in its entirety.

FIELD

Embodiments of the present disclosure relate generally to mobile electronic devices, and more particularly relate to mobile electronic device comprising multiple displays.

BACKGROUND

Some mobile phones comprise multiple display modules with touch panels. The mobile phones may be switched from a closed state in which a display module is exposed to outside to an open state in which multiple display modules are exposed to outside. A user may unintentionally touch a touch panel while the mobile phone is switching from the close state to the open state. The touch panel may detect an input caused by the user touching the touch panel. In this manner, an unintended action in response to the detected input may be executed despite the user's intentions.

SUMMARY

A mobile electronic device and method for operating a mobile electronic device are disclosed. A first detected input is detected on the first display module. A second detected input is detected on the second display module. The first detected input is set to an invalid input, when the second detected input is detected during a device configuration of the mobile electronic device, the device configuration comprising at least a portion of a first display module being exposed, and at least a portion of a second display module being exposed. The second detected input is set to an invalid input, when the first detected input is detected in the device configuration.

In an embodiment, a mobile electronic device comprises a first housing, a second housing, a mechanical section, a first detection module, a second detection module, and a setting module. The first housing comprises a first display module. The second housing comprises a second display module. The mechanical section connects the first housing and the second housing and switches between a first configuration and a second configuration. The first configuration comprises only the first display module exposed, and the second configuration comprises at least a portion of the second display module and the first display module exposed. The first detection module detects a first detected input on the first display module. The second detection module detects a second detected input on the second display module. The setting module sets the first detected input to an invalid input, when the second detected input is detected during the second configuration, and sets the second detected input to an invalid input, when the first detected input is detected during the second configuration.

In another embodiment, a method for operating a mobile electronic device, detects a first detected input on the first display module. The method further detects a second detected input on the second display module. The method then sets the first detected input to an invalid input, when the second detected input is detected during a device configuration of the mobile electronic device, the device configuration comprising at least a portion of a first display module being exposed, and at least a portion of a second display module being exposed. The method also sets the second detected input to an invalid input, when the first detected input is detected in the device configuration.

In a further embodiment, a computer readable storage medium comprising computer-executable instructions for operating a mobile electronic device. The method executed by the computer-executable instructions detects a first detected input on the first display module. The method executed by the computer-executable instructions further detects a second detected input on the second display module. The method executed by the computer-executable instructions method then sets the first detected input to an invalid input, when the second detected input is detected during a device configuration of the mobile electronic device, the device configuration comprising at least a portion of a first display module being exposed, and at least a portion of a second display module being exposed. The method executed by the computer-executable instructions also sets the second detected input to an invalid input, when the first detected input is detected in the device configuration.

BRIEF DESCRIPTION OF THE DRAWINGS

Embodiments of the present disclosure are hereinafter described in conjunction with the following figures, wherein like numerals denote like elements. The figures are provided for illustration and depict exemplary embodiments of the present disclosure. The figures are provided to facilitate understanding of the present disclosure without limiting the breadth, scope, scale, or applicability of the present disclosure.

FIG. 5 is an illustration of an exemplary flowchart showing a process for controlling inputs on each display surface according to an embodiment of the disclosure.

FIGS. 7A to 7C are exemplary illustrations of a mobile phone showing a switching operation from an open state to a closed state according to an embodiment of the disclosure.

DETAILED DESCRIPTION

The following description is presented to enable a person of ordinary skill in the art to make and use the embodiments of the disclosure. The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. The present disclosure should be accorded scope consistent with the claims, and not limited to the examples described and shown herein.

Embodiments of the disclosure are described herein in the context of one practical non-limiting application, namely, a mobile electronic device such as a mobile phone. Embodiments of the disclosure, however, are not limited to such mobile phone, and the techniques described herein may be utilized in other applications. For example, embodiments may be applicable to digital books, digital cameras, electronic game machines, digital music players, personal digital assistance (PDA), personal handy phone system (PHS), lap top computers, TV's, Global Positioning Systems (GPSs) or navigation systems, pedometers, health equipment, display monitors, or other electronic device that uses a display screen or a touch panel for displaying information.

As would be apparent to one of ordinary skill in the art after reading this description, these are merely examples and the embodiments of the disclosure are not limited to operating in accordance with these examples. Other embodiments may be utilized and structural changes may be made without departing from the scope of the exemplary embodiments of the present disclosure.

Figure 1:
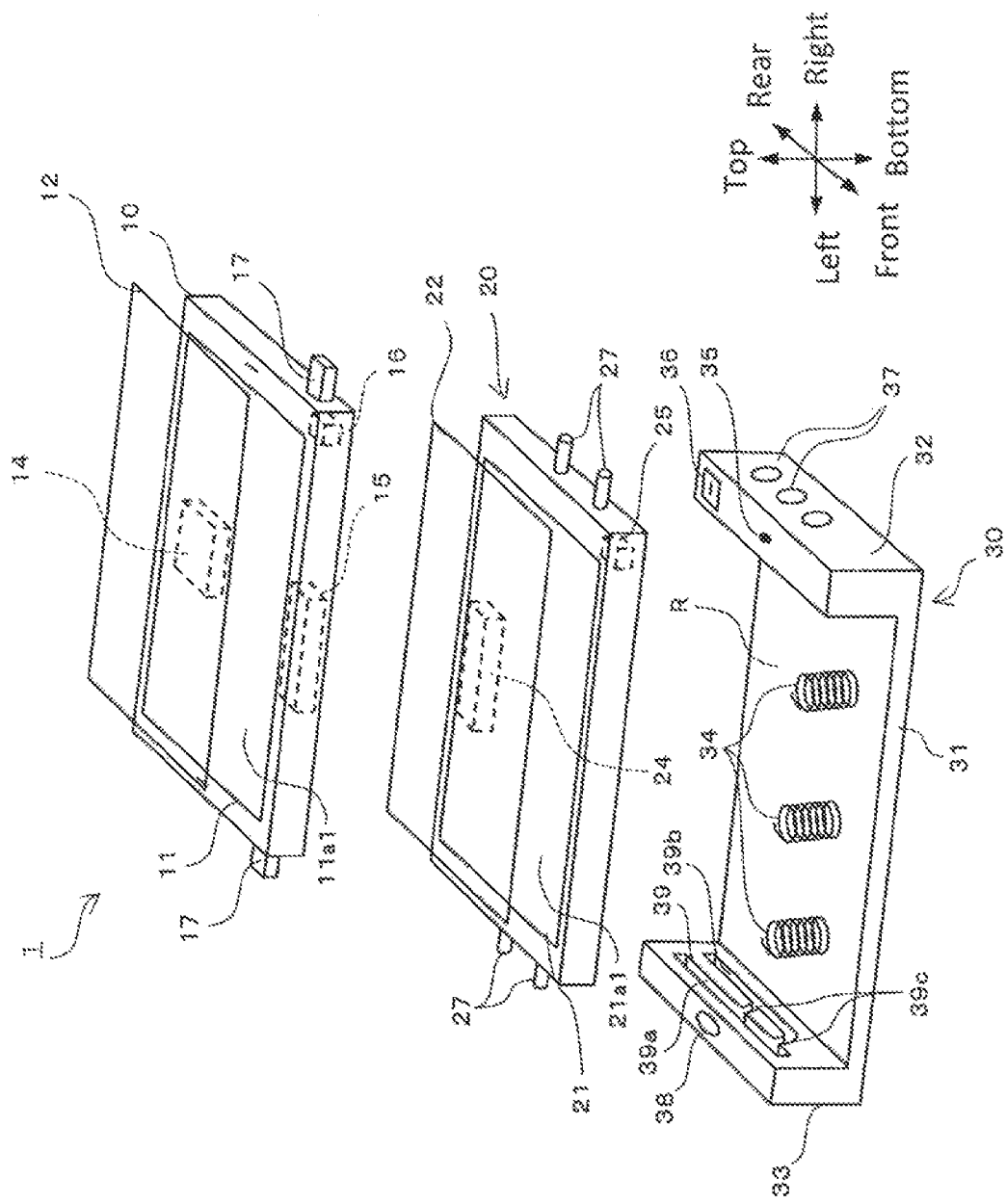
FIG. 1 is an illustration of an exemplary mobile phone showing an exterior appearance thereof according to an embodiment of the disclosure.

FIG. 1 is an illustration of an exemplary mobile phone 1 showing an exterior appearance thereof according to an embodiment of the disclosure. The mobile phone 1 comprises a first cabinet 10, a second cabinet 20, and a supporter 30 that holds the first cabinet 10 and the second cabinet 20.

The first cabinet 10 (first housing 10) has a horizontally long and cuboid shape. The first cabinet 10 comprises a first touch panel. The first touch panel comprises a first display 11 and a first touch sensor 12.

The first display 11 corresponds to a display module and may display an image on a first display surface 11a1. The first display 11 comprises a first liquid crystal panel 11a and a first backlight 11b. The display surface 11a1 is located in front of the first liquid crystal panel 11a. The first touch sensor 12 is overlaid on top of the first display surface 11a1. The first backlight 11b comprises one or more light sources and illuminates the first liquid crystal panel 11a.

The first touch sensor 12 corresponds to a first detection module that detects an input on the first display 11. The first touch sensor 12 is a transparent, rectangular sheet and covers the first display surface 11a1 of the first display 11. The first touch sensor 12 comprises a plurality of transparent electrodes arranged in a matrix configuration. The first touch sensor 12 may detect a location on the first display surface 11a1 where a user touches by detecting the change of capacitance between transparent electrodes. The first touch sensor 12 outputs location signals corresponding to the detected location (also referred to an input location). Furthermore, a user may touch the first display surface 11a1 or a second display surface 21a1 explained below with a finger or a touching object, such as, but not limited to, a pen. A user may keep a finger or a touching object touching the first display surface 11a1 or the second display surface 21a1 still or may move the finger or the touching object. The duration when a touching object or a finger is in contact with the first display surface 11a1 or the second display surface 21a1 may be short or long. A user touching the first display surface 11a1 or the second display surface 21a1 may be referred to as an input by a user.

The first cabinet 10 comprises a camera module 14 in the middle and slightly toward the rear position of the inside thereof. The first cabinet 10 also comprises a lens window (not shown in the figure) on a bottom surface thereof to take in a subject image in the camera module 14.

The first cabinet 10 comprises a magnet 15 and a magnet 16. The first cabinet comprises the magnet 15 in the middle position in the vicinity of the front surface thereof and the magnet 16 at a right front corner thereof.

The first cabinet 10 comprises a protruding member 17. The first cabinet 10 comprises the protruding member 17 on a right side and on a left side thereof.

The second cabinet 20 (second housing 20) may have a horizontally long and cuboid shape and have nearly the same shape and the size of the first cabinet 10. The second cabinet 20 comprises a second touch panel. The second touch panel comprises a second display 21 and a second touch sensor 22.

The second display 21 corresponds to a display module and may display an image on a second display surface 21a1. The second display 21 comprises a second liquid crystal panel 21a and a second backlight 21b. The second display surface 21a1 is located in front of the second liquid crystal panel 21a. The second backlight 21b comprises one or more light sources and illuminates the second liquid crystal panel 21a. The first display 11 and the second display 21 may also comprise a display element such as, but without limitation, an organic electro luminous (EL) panel, liquid crystal panel (LCD), or other display.

The second touch sensor 22 corresponds to a second detection module that detects an input on the second display 21. The second touch sensor 22 may have the same shape and the configuration of the first touch sensor 12. The second touch sensor covers the second display surface 21a1 of the second display 21. The second touch sensor 22 may detect a location on the second display surface 21a1 touched by a user. The second touch sensor 22 outputs location signals corresponding to the detected location (also called an input location).

The second cabinet 20 comprises a magnet 24. The second cabinet 20 comprises the magnet 24 in the middle position in the vicinity of the rear surface thereof. The magnet 24 and the magnet 15 in the first cabinet 10 are configured to attract each other in an open state explained below.

Figure 3:
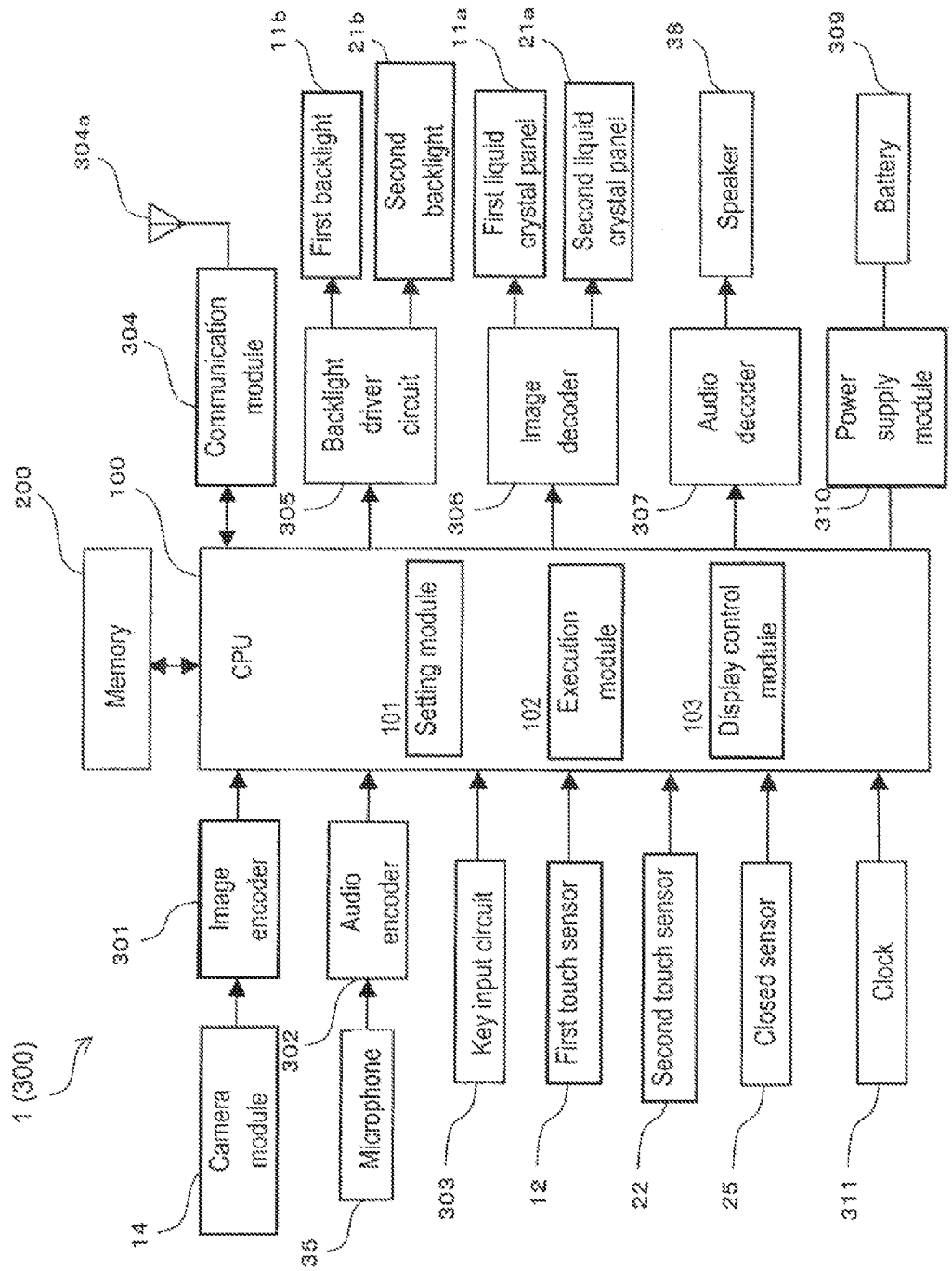
FIG. 3 is an illustration of an exemplary functional block diagram of a mobile phone according to an embodiment of the disclosure.

The second cabinet 20 comprises a closed sensor 25. The second cabinet 20 comprises the closed sensor 25 at a right front corner. The closed sensor 25 comprises, for example, but without limitation, a Hall effect integrated circuit (IC) or other sensor and outputs sensor signals when detecting the magnetic force of the magnet 16. In a closed state explained below, the magnet 16 in the first cabinet 10 approaches closely to the closed sensor 25. Thus, the closed sensor 25 detects the magnetic force of the magnet 16 and outputs sensor signals to a CPU 100 (FIG. 3). On the other hand, in an open state, the magnet 16 in the first cabinet 10 moves away from the closed sensor 25. The closed sensor 25 does not output sensor signals to the CPU 100 because the closed sensor 25 does not detect the magnetic force of the magnet 16.

The second cabinet 20 comprises two shanks 27 respectively on the both side surfaces thereof.

The supporter 30 comprises a base plate module 31, a right holding module 32 located at a right edge of the base plate module 31, and a left holding module 33 located at a left edge of the base plate module 31.

On the base plate module 31, three coil springs 34 are horizontally arranged side by side in a direction from right to left. Since the second cabinet 20 is fixed in the supporter 30, the coil springs 34 come in contact with the bottom surface of the second cabinet 20 and provide the force to push the second cabinet 20 upward.

A microphone 35 and a power key 36 are located on the top surface of the right holding module 32. A speaker 38 is located on the top surface of the left holding module 33. A plurality of hard keys 37 is located on the outside side surfaces of the right holding module 32.

The right holding module 32 and the left holding module 33 comprise guide grooves 39 on the inside side surfaces thereof (inside side surface of the left holding module 33 shown in FIG. 1). A guide groove 39 comprises an upper groove 39a, a lower groove 39b, and two vertical grooves 39c. The upper groove 39a and the lower groove 39b are extended in a longitudinal direction or in a direction from front to rear, and the vertical grooves 39c are extended in the vertical direction or in a direction from top to bottom for connecting the upper groove 39a and the lower groove 39b.

When the mobile phone 1 is assembled, the shanks 27 are inserted into the lower grooves 39b of the guide grooves 39. The second cabinet 20 is housed in the housing area R of the supporter 30. The protruding members 17 are inserted into the upper grooves 39a of the guide grooves 39. The first cabinet 10 is disposed on top of the second cabinet 20 and housed in the housing area R of the supporter 30.

Thus, the first cabinet 10 and the second cabinet 20 are housed one above the other in the housing area R surrounded by the base plate module 31, the right holding module 32, and the left holding module 33. In this configuration, the first cabinet 10 may slide back and forth guided by the upper grooves 39a. The second cabinet 20 may slide back and forth guided by the lower grooves 39b. When the second cabinet 20 moves forward, and when the shanks 27 reach the vertical grooves 39c, the second cabinet 20 may slide up and down guided by the vertical grooves 39c.

FIGS. 2A to 2D are illustrations of the mobile phone 1 shown in FIG. 1 showing a switching operation from a closed state to an open state according to an embodiment of the disclosure. The first cabinet 10 is superimposed on top of the second cabinet 20 in the closed state shown in FIG. 2A. The closed state corresponds to a first configuration in which the second display surface 21a1 is covered with the first cabinet 10. In the closed state, only the first display surface 11a1, among the first display surface 11a1 and the second display surface 21a1, is exposed outside.

Figure 2A:
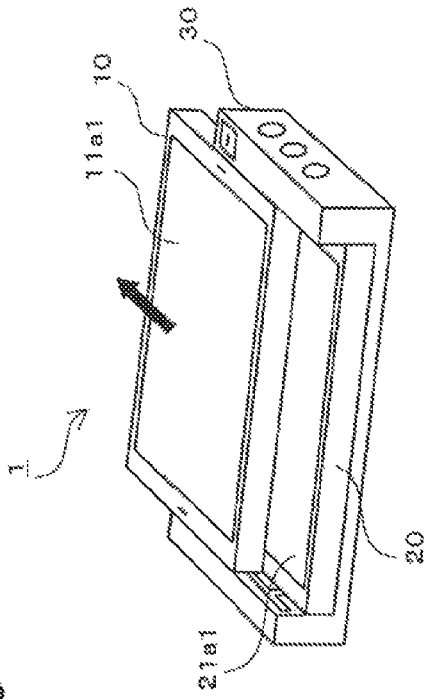
FIGS. 2A to 2D are illustrations of the mobile phone shown in FIG. 1 showing a switching operation from a closed state to an open state according to an embodiment of the disclosure.
Figure 2B:
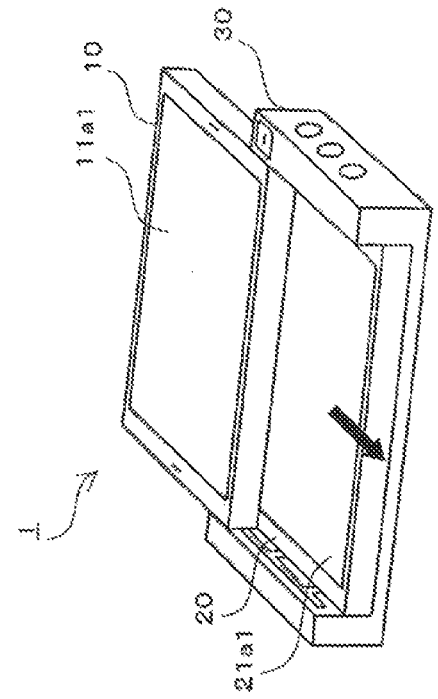
Figure 2C:
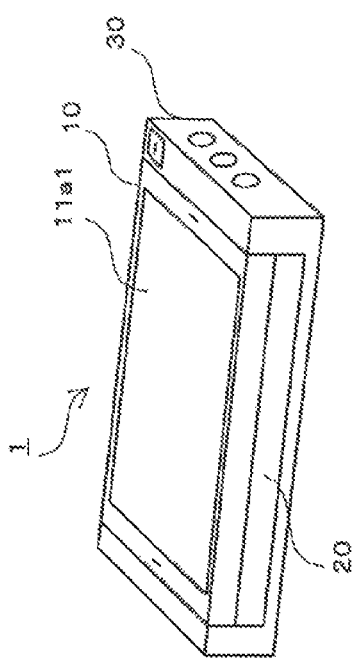

The first cabinet 10 moves in a direction of an arrow shown in FIG. 2B, and the second cabinet 20 moves in a direction of an arrow shown in FIG. 2C. Thus, when the closed sensor 25 no longer detects the magnetic force of the magnet 16 and no longer outputs sensor signals, the mobile phone 1 is switched to an open state. In the open state, at least a part of the second display surface 21a1 is exposed outside.

When the second cabinet is no longer substantially completely overlapped with the first cabinet 10, the shanks 27 shown in FIG. 1 reach the vertical grooves 39c. Thus, the shanks 27 move along the vertical grooves 39c, and the cabinet 20 is able to move up and down. In this manner, the second cabinet 20 moves upward due to the elastic force of the coil springs 34 and the attracting force of the magnet 15 and the magnet 24.

Figure 2D:
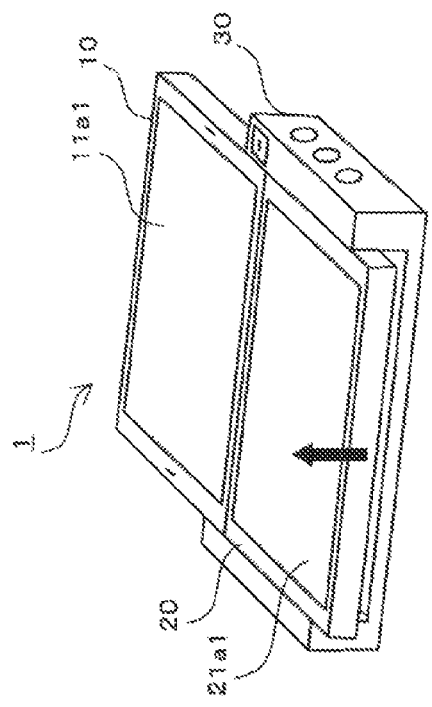

As shown in FIG. 2D, the second cabinet 20 and the first cabinet 10 are aligned and in contact with each other, and the second display surface 21a1 becomes as high as the first display surface 11a1. Hence, the first display surface 11a1 and the second display surface 21a1 are both exposed outside.

Furthermore, as shown in FIG. 2B through FIG. 2D, an open state corresponds to a second configuration in which at least a part of the second display surface 21a1 is exposed outside.

The protruding members 17 move along the upper grooves 39a of the guide grooves 39, and the shanks 27 move along the lower grooves 39b, the vertical grooves 30c, and the upper grooves 39a; a closed state and an open state are switched. Therefore, the protruding members 17, the shanks 27, and the guide grooves 39 correspond to a mechanical section that connects the first cabinet 10 (first housing 10) and the second cabinet 20 (second housing 20) and enables to switch the closed state and the open state.

In one embodiment, the mechanical section connects the first housing 10 and the second housing 20 and switch between a first configuration and a second configuration (device configuration), the first configuration comprising only the first display module exposed, and the second configuration comprising at least a portion of the second display module (second display 21) and the first display module (first display 11) exposed.

A setting module 101 (FIG. 3) sets the first detected input to an invalid input, when the second detected input is detected during the second configuration, and set the second detected input to an invalid input, when the first detected input is detected during the second configuration as explained in more detail below.

FIG. 3 is an illustration of an exemplary functional block diagram of the mobile phone 1 according to an embodiment of the disclosure. The mobile phone 1 comprises the CPU 100, a memory 200, an image encoder 301, an audio encoder 302, a key input circuit 303, a communication module 304, a backlight driver circuit 305, an image decoder 306, an audio decoder 307, a battery 309, a power supply module 310, and a clock 311 in addition to the components described above.

The camera module 14 comprises an image sensor, such as a charge-coupled device (CCD) or the other device. The camera module 14 digitalizes imaging signals output from the image sensor, performs various corrections for the imaging signals, such as a gamma correction, and outputs the corrected imaging signals to the image encoder 301. The image encoder 301 performs an encoding process on the imaging signals from the camera module 14 and outputs the encoded imaging signals to the CPU 100.

The microphone 35 converts collected sounds to audio signals and outputs the converted the audio signals to the audio encoder 302. While converting analogue audio signals from the microphone 35 to digital audio signals, the audio encoder 302 performs an encoding process on the digital audio signals and outputs the encoded digital audio signals to the CPU 100.

The key input circuit 303 outputs input signals corresponding to each key, such as the power key 36 or the hard keys 37, to the CPU 100 when a user presses the respective keys.

The communication module 304 converts data from the CPU 100 into wireless signals and transmits the wireless signals to base stations through an antenna 304a. The communication module 304 also converts wireless signals received through the antenna 304a into data and outputs the data into the CPU 100.

The backlight drive circuit 305 applies the voltage corresponding to control signals from the CPU 100 to the first backlight 11b and the second backlight 21b. The first backlight 11b is lit up due to the voltage by the backlight drive circuit 305 and illuminates the first liquid crystal panel 11a.

The second backlight 21*b* is lit up due to the voltage by the backlight drive circuit 305 and illuminates the second liquid crystal panel 21*a*.

The image decoder 306 converts image data from the CPU 100 into image signals that may be displayed on the first liquid crystal panel 11*a* and the second liquid crystal panel 21*a* and outputs the image signals to the liquid crystal panels 11*a* and 21*a*. The first liquid crystal panel 11*a* displays images corresponding to the image signals on the first display surface 11*a*1. The second liquid crystal panel 21*a* displays images corresponding to the image signals on the second display surface 21*a*1.

The audio decoder 307 performs decoding a process on audio signals from the CPU 100 and sound signals of various notification sounds, such as a ringtone and a alarm sound; then the audio decoder 307 further converts the audio signals and the sound signals into analogue signals and outputs the analogue signals to a speaker 38. The speaker 38 plays the audio signals and the sound signals from the audio decoder 307.

The battery 309 provides electricity to each component, such as the CPU 100 and/or other components other than the CPU 100 and comprises a secondary cell. The battery 309 is connected to the power supply module 310.

The power supply module 310 converts the voltage from the battery 309 into the voltage level that each component requires and provides the converted voltage to each component. In addition, the power supply module 310 provides electricity from an external power source (not shown) to the battery 309 and charges the battery 309.

The clock 311 measures time and outputs signals corresponding to the measured time to the CPU 100.

The memory 200 may be any suitable data storage area with suitable amount of memory that is formatted to support the operation of the system 300. Memory 200 is configured to store, maintain, and provide data as needed to support the functionality of the system 300 in the manner described herein. In practical embodiments, the memory 200 may comprise, for example but without limitation, a non-volatile storage device (non-volatile semiconductor memory, hard disk device, optical disk device, and the like), a random access storage device (for example, SRAM, DRAM), or any other form of storage medium known in the art. The memory 200 may be coupled to the CPU 100 and configured to store, for example but without limitation, control programs for assigning control functions to the CPU 100. The control program comprises, for example but without limitation, a control program that enables setting an input on each display surface 11*a*1/21*a*1 valid or invalid, or other application.

The memory 200 stores image data of an operation option screen. An operation option screen comprises one or more icons. Icons comprised on the operation option screen may be preset or may be set arbitrarily by a user. An icon is an image indicating a content of a process. The memory 200 associates a content of a process indicated by an icon with a location where an icon is displayed, and stores the associated relationship. As a process, execution of an application program (hereinafter, called "an application") associated with an icon, execution of a file associated with an icon and other execution are listed. These application and files are stored in the memory 200.

The CPU 100 comprises a setting module 101, an execution module 102, and a display control module 103.

The CPU 100 is able to operate the camera module 14, the microphone 35, the communication module 304, the liquid crystal panels 11*a* and 21*a*, and the speaker 38 in accordance with a control program. Thus, the CPU 100 executes various applications, such as a phone call function, an e-mail function, a key-lock function or other function. The CPU 100 may execute the control program based on location signals from each touch sensor and input signals from the key input circuit 303.

The CPU 100, as the setting module 101, is able to set an input on each display surface a valid input or an invalid input. When an input on each display surface is set valid (valid input), the CPU 100 receives location signals from each touch sensor and directs an execution module 102 described below to execute a process associated with the input location identified by the location signals. When an input on each display surface is set invalid, the CPU 100 does not direct the execution module 102 to execute a process associated with the location signals upon receiving the location signals from each touch sensor.

In addition, because the first cabinet 10 hides the second display surface 21*a*1 in a closed state, a user is not able to input on the second display surface 21*a*1. Thus, the process corresponding to the input on the second display surface 21*a*1 is not executed. For this reason, the CPU 100 may or may not set an input from the second touch sensor 22 invalid in a closed state. The first touch sensor 12 and the second touch sensor 22 may output a user's input, which is detected, to the CPU 100 as location signals.

A setting of validity or invalidity for a detected input may be changed according to an input by a user. When both touch sensors have not been detecting an input, and when the first touch sensor 12, out of the both touch sensors, detects an input, the CPU 100 sets an input detected by the second touch sensor 22 invalid while the first touch sensor 12 is detecting the input. When both touch sensors have not been detecting an input, and when the second touch sensor 22, out of the both touch sensors, detects an input, the CPU 100 sets an input detected by the first touch sensor 12 invalid while the second touch sensor 22 is detecting the input.

In addition, when the both touch sensors 12/22 have not been detecting an input, an input that either one of the touch sensors 12/22 first detects may be referred to "a preceding input" or "a first input."

For example, when the mobile phone 1 is switched from a closed state to an open state, both touch sensors 12/22 become able to detect an input, because the second touch sensor 22 becomes able to detect an input. For this reason, after switching from a closed state to an open state, an input that either one of the both touch sensors detects for the first time after the switching to an open state may be a first input. While a first input is being detected, an input detected by a touch sensor that is not detecting the first input is invalidated.

Each time a finger disengages from respective display surfaces in an open state, the both touch sensors no longer detect an input. When a finger touches one of the display surfaces 11*a*1/21*a*1 after disengaging from the display surfaces 11*a*1/21*a*1, an input triggered by the touching may be referred to a first input. That is, when one of the touch sensors 12/22 detects an input after both the touch sensors 12/22 have not been detecting an input, the detected input may be referred to a first input. While a finger is touching one of the display surfaces 11*a*1/21*a*1, an input on the other display surface is rendered invalid (invalid input).

In this regard, when one of the touch sensors 12/22 detects an input following on a first input (hereinafter, referred to "a follow-on input" or "a second input") within a prescribed period of time after the other touch sensor detecting the first input, the CPU 100 sets the inputs detected by both the touch sensors 12/22 valid. Specifically, when the CPU 100 receives location signals from one of the touch sensors 12/22 within the prescribed period of time after receiving location signals from the other touch sensor among the touch sensors 12/22, the CPU 100 determines that the first display surface 11a1 and the second display surface 21a1 are touched at the same time and sets the inputs on the first display surface 11a1 and the second display surface 21a1 valid. That is, the CPU 100 sets location signals output from the first touch sensor 12 and the second touch sensor 22 valid. Inputs on the first display surface 11a1 and the second display surface 21a1 are set valid while a predefined screen described below is being displayed. Hence, the CPU 100, as an execution module 102, executes a process corresponding to an input by a user on the predefined screen.

The CPU 100, as the execution module 102, executes a process corresponding to a user's input while inputs on the respective display surfaces 11a1 and 21a1 are set valid. For example, when a user selects an icon displayed on a display surface, the CPU 100 receives location signals from one of the touch sensors 12/22 and seeks an input location corresponding to the location signals. The CPU 100 identifies an icon displayed on the input location and a process associated with the icon based on the corresponding information stored in the memory 200. The CPU 100 reads out a program, such as an application program or other program, from the memory 200 and executes the read out program.

The CPU 100, as the display control module 103, outputs control signals to the image decoder 306 and the backlight drive circuit 305. For example, the CPU 100 controls the backlight drive circuit 305 and turns off the respective backlight 11b and 21b. On the other hand, while lighting up the respective backlight 11b and 21b, the CPU 100 controls the image decoder 306 and displays images on the respective display surfaces 11a1 and 21a1. The CPU 100 also controls contrast, brightness, a screen size, and transparency of a screen when it displays an image on the respective display surface 11a1 and 21a1.

In one embodiment, the display control module 103 displays a first prescribed screen on the first display module (first display 11) and a second prescribed screen on the second display module (second display 21) when the first detection module (first touch sensor 12) detects the first detected input and the second detection module (second touch sensor 22) detects the second detected input within a predefined period of time.

Figure 4:
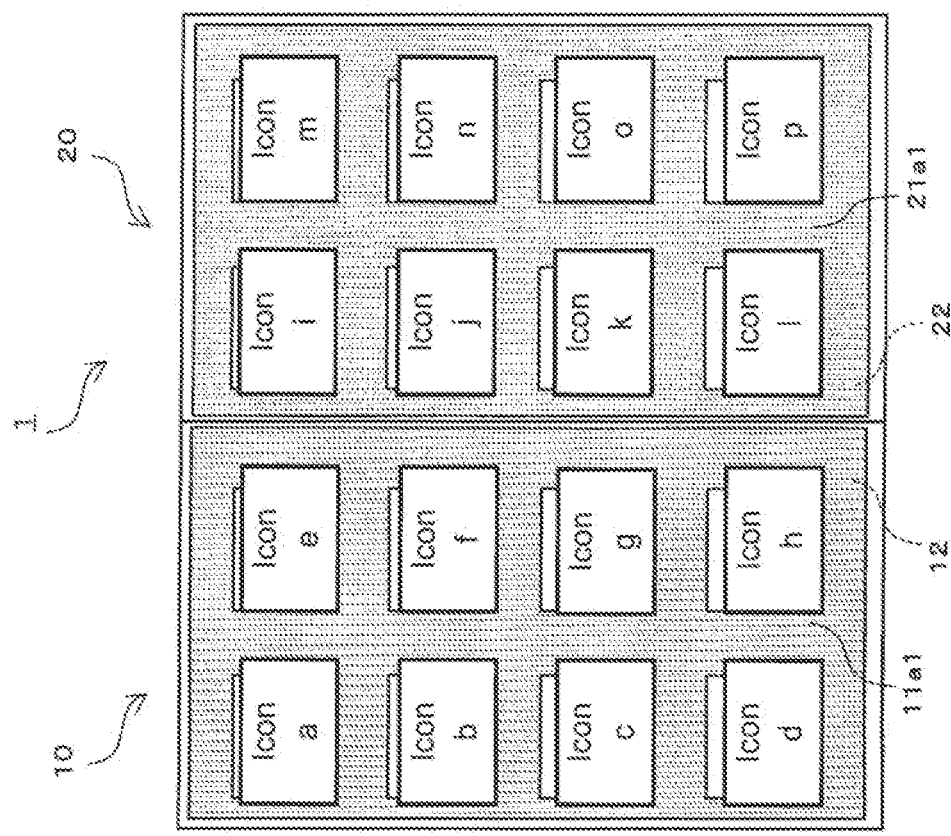
FIG. 4 are illustrations of exemplary operation option screens displayed on two display surfaces according to an embodiment of the disclosure.

For example, when the setting module 101 determines simultaneous touches, the CPU 100 reads out image data of a predefined screen shown in FIG. 4 from the memory 200 and displays the predefined screen on the first display surface 11a1 and the second display surface 21a1. For example, operation option screens shown in FIG. 4 are displayed on the first display surface 11a1 and the second display surface 21a1 as the predefined screens. A plurality of icons, for example, sixteen icons, is arranged on an operation option screen. A predefined screen may be preset or arbitrarily set by a user.

FIG. 4 are illustrations of exemplary operation option screens displayed on two display surfaces such as the first display surface 11a1 and the second display surface 21a1 according to an embodiment of the disclosure.

FIG. 5 is an illustration of an exemplary flowchart showing a process 500 for controlling inputs on each display surface according to an embodiment of the disclosure. The process 500 sets an input on the first display surface 11a1 and the second display surface 21a1 valid or invalid.

The various tasks performed in connection with the process 500 may be performed by software, hardware, firmware, a computer-readable medium having computer executable instructions for performing the process method, or any combination thereof. The process 500 may be recorded in a computer-readable medium such as a semiconductor memory, a magnetic disk, an optical disk, and the like, and can be accessed and executed, for example, by a computer CPU such as the CPU 100 in which the computer-readable medium is stored.

It should be appreciated that process 500 may include any number of additional or alternative tasks, the tasks shown in FIG. 5 need not be performed in the illustrated order, and process 500 may be incorporated into a more comprehensive procedure or process having additional functionality not described in detail herein. In practical embodiments, portions of the process 500 may be performed by different elements of the system 300. Process 500 may have functions, material, and structures that are similar to the embodiments shown in FIGS. 1-4. Therefore common features, functions, and elements may not be redundantly described here.

While a mode of restricting an input by a user on the first display surface 11a1 and the second display surface 21a1 is in effect, the CPU 100 executes a process of setting location signals output from the first touch sensor 12 and the second touch sensor 21 valid or invalid.

While an input by a user on the first display surface 11a1 and the second display surface 21a1 is set valid, the CPU 100 monitors a first input on the first display surface 11a1 or the second display surface 21a1 (task S101).

For example, when a user touches the first display surface 11a1, the CPU 100 receives location signals from the first touch sensor 12 and determines that the first input is entered (task S101: YES).

Next, the CPU 100 determines which state the mobile phone 1 is in when the first input is detected (task S102). If the CPU 100 has been receiving sensor signals from the closed sensor 25, the CPU 100 determines that the mobile phone 1 is not in an open state (task S102: NO). In this manner, a user is unable to input on the second display surface 21a1 because the mobile phone 1 is in a closed state. For this reason, even if a user enters the first input on the first display surface 11a1, it may not be necessary that an input on the second display surface 21a1 to be set invalid. Therefore, the CPU 100 may return to a process of task S101 and further monitor the first input.

By contrast, if the CPU 100 has not been receiving sensor signals from the closed sensor 25, the CPU 100 determines that the mobile phone 1 is in an open state (task S102: YES). In an open state, a user is able to enter an input on the both display surfaces because the both display surfaces are exposed outside.

Next, the CPU 100 measures time elapsed since a precede input (a first input) on the first display surface 11a1 based on signals from the clock 311 (task S103). By using the measured elapsed time, the CPU 100 monitors whether or not it has received location signals from the second touch sensor 22 within a prescribed period of time (task S104).

When a user touches the first display surface 11a1 and the second display surface 21a1 simultaneously, the CPU 100 receives location signals from the second touch sensor 22 within the prescribed period of time after the first input. The CPU 100 determines that the first input on the first display surface 11a1 and the second input on the second display surface 21a1 are simultaneous touches which are entered simultaneously based on the location signals.

If the CPU 100 determines two inputs (the first input and the second input) are simultaneous touches, it displays operation option screens on the first display surface 11a1 and the second display surface 21a1 (task S105). While displaying the operation option screens on both the first display surface 11a1 and the second display surface 21a1, the CPU 100 sets location signals output from the both touch sensors valid. Here, when a user selects an icon on the operation option screens, the CPU 100 executes an application corresponding to the icon (task S106: YES). Hereby, an application screen is displayed on both or either one of the first display surface 11a1 and the second display surface 21a1 instead of the operation option screens. The CPU 100 returns to a process of task S101 and starts a process of setting location signals output from the first display surface 11a1 and the second display surface 21a1 valid or invalid depending on a user operation.

On the other hand, when a user touches the second display surface 21a1 after a lapse of the prescribed period of time after a user touching the first display surface 11a1, the CPU 100 determines that the first input (preceding input) on the first display surface 11a1 and the second input (follow-on input) on the second display surface 21a1 are not simultaneous touches (task S104: NO). Hereby, the CPU 100 sets the follow-on input on the second display surface 21a1 invalid (task S107). That is, the CPU 100 determines that location signals output from the second touch panel are invalid. Therefore, even if a user touches on an icon on the second display surface 21a1 with his/her finger, the CPU 100 does not execute a process corresponding to the icon.

The CPU 100 continues to monitor the first input on the first display surface 11a1 and determines that the first input is continuing while receiving location signals from the first touch sensor 12 (task S108: YES). Thus, if a user does not disengage his/her finger after touching the first display surface 11a1 for the first time, the CPU 100 sets a second input on the second display surface 21a1 invalid (task S107). While a user is touching the first display surface 11a1, he/she may not need to worry about a touching location on the second display surface 21a1.

By contrast, when a user disengages his/her finger from the first display surface 11a1, the CPU 100 determines that the first input is not continuing (task S108: NO). That is, when the CPU 100 no longer receives location signals from the first touch sensor 12, the CPU 100 determines the first input is not continuing. Then, the CPU 100 sets an input on the second display surface 21a1 from invalid to valid (task S109). Thus, the CPU 100 determines that location signals received from the second touch sensor 22 are valid. The CPU 100 returns to task S101 after task S109.

In this way, according to the present embodiment, the CPU 100 sets an input on either one of the first display surface 11a1 and the second display surface 21a1 that a user touches first valid. The CPU 100 sets an input on a display surface invalid while the other display surface is being touched.

Figure 6A:
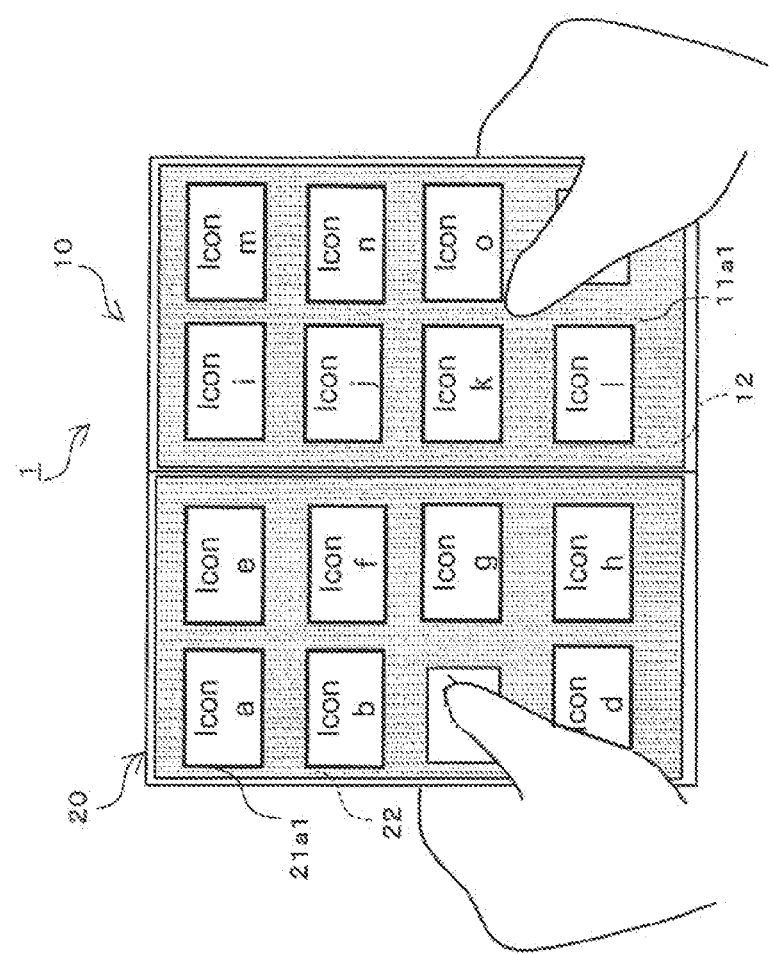
FIGS. 6A to 6B are illustrations of an exemplary mobile phone showing an exemplary switching operation from a closed state to an open state according to an embodiment of the disclosure.
Figure 6B:
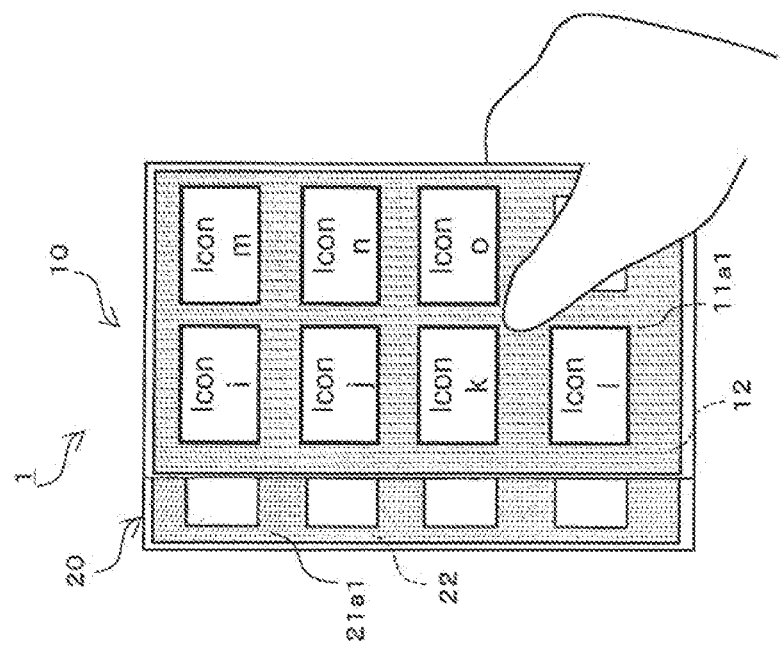

Therefore, when the mobile phone 1 is switched from a closed state to an open state, a user places his/her finger carefully on a location where an icon is not displayed while looking at a screen of the first display surface 11a1 exposed outside as shown in FIG. 6A. As long as the user does not disengage his/her finger after he/she first touches the first display surface 11a1, the mobile phone 1 does not malfunction even if any of other fingers accidentally touch an icon on the second display surface 21a1. Thus, without worrying about a location that a user touches on the second display surface 21a1, a user may hold the second cabinet 20 and switch the mobile phone 1 from a closed state to an open state.

When the mobile phone 1 is switched from an open state to a closed state, a user places his/her finger on a location where an icon is not displayed while looking at an arrangement of icons on the first display surface 11a1 as shown in FIG. 7A. If a user does not touch the first display surface 11a1 and the second display surface 21a1 simultaneously or almost simultaneously, the CPU 100 determines the touches are not simultaneous touches and sets the input on the second display surface 21a1 invalid. Thus, as shown in FIG. 7B, as long as a user is touching the first display surface 11a1, he/she may be able to hold the second cabinet 20 without worrying about locations of icons on the second display surface 21a1. As the first cabinet 10 laps over the second cabinet 20 as shown in FIG. 7C, the exposed area of the second display surface 21a1 becomes narrow, and a user needs to move locations of his/her fingers on the second display surface 21a1. However, while a user's finger is touching the first display surface 11a1, an input on the second display surface 21a1 is set invalid. For that reason, a user may move locations of his/her fingers without worrying about locations of icons displayed on the second display surface 21a1.

Thus, in cases where a user frequently touches each display surface by error, for example, in a case where he/she is switching a state of the mobile phone 1, the mobile phone 1 may excel at operability because a user does not need to worry about a location where he/she touches on the both display surfaces.

In addition, while entering an input on one display surface, even if a user accidentally enters an input on the other display surface, which is not operated, a process corresponding to the accidental input may not be executed according to the present embodiment. Such execution of a process unintended by a user may be prevented. While performing an input operation on one of the display surfaces, a user does not need to pay attention to an input on the other display surface, and the mobile phone 1 may excel at operability.

Furthermore, when a user touches the both display surfaces 11a1/21a1 simultaneously, a prescribed screen, such as an operation option screen and/or other screen, is displayed on both the first display surface 11a1 and the second display surface 21a1, and an input on the prescribed screens is set valid according to the present embodiment. Thus, when a timing of touches by a user, such as simultaneous touches, is adjusted, inputs on the first display surface 11a1 and the second display surface 21a1 are set valid in compliance with a user's intention, and the mobile phone 1 may excel at convenience.

While an input is being detected on either one of the first display surface 11a1 and the second display surface 21a1, an input on the other display surface is set invalid in the present embodiment. By contrast, when a precede input (first input) on either one of the both display surface 11a1 and 21a1 is detected and then becomes no longer detected by the respective touch sensor 12 or 22, an input on the other display surface may also be set invalid (invalid input) within the predefined period of time after the precede input. Hereby, while a user is performing a series of operation on either one of the display surface 11a1 and 21a1, an input on the other display surface is limited, and the operability is further enhanced.

In this present embodiment, when one of the both touch sensors detects a second input within the predefined period of time after the other touch sensor detects a first input, the CPU 100 determines that the detected inputs are simultaneous touches. Although the predefined time between the first input and the second input is set, a predefined period of time may not be set. In this case, only when a user touches both the display surface 11a1 and 21a1 at the same time, the CPU 100 determines that the detected inputs by the both touch sensors are simultaneous touches and displays operation option screens on the first display surface 11a1 and the second display surface 21a1. In addition, when simultaneous touches are performed, the both touches may be configured not to be accepted without displaying an operation option screen.

When the first display surface 11a1 and the second display surface 21a1 are touched concurrently, an operation option screen is displayed on the first display surface 11a1 and the second display surface 21a1 in this present embodiment. However, an operation option display may not necessarily be displayed. In this case, the inputs by simultaneous touches are not accepted.

Furthermore, in the present embodiment, the closed sensor 25 is provided at the right front corner of the second cabinet 20. However, an open sensor may be provided instead of or with the closed sensor 25. An open sensor may be arranged at a right rear corner of the second cabinet 20. As the mobile phone 1 is switched from a closed state to an open state, the magnet 16 in the first cabinet 10 approaches closely to an open sensor, and the open sensor outputs signals to the CPU 100. A time after signals from the closed sensor 25 is gone and before signals from an open sensor are output to the CPU 100 is determined as a switching time of the mobile phone 1. If inputs on the both display surface 11a1 and 21a1 are invalidated during the switching time, a false operation may be further prevented.

In this document, the terms "computer program product", "computer-readable medium", and the like may be used generally to refer to media such as, for example, memory, storage devices, or storage unit. These and other forms of computer-readable media may be involved in storing one or more instructions for use by the CPU 100 to cause the CPU 100 to perform specified operations. Such instructions, generally referred to as "computer program code" or "program code" (which may be grouped in the form of computer programs or other groupings), when executed, enable a method of operating a mobile electronic device of the system 300.

Terms and phrases used in this document, and variations hereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the present disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

The invention claimed is:

1. A mobile electronic device, comprising:
    a first housing comprising a first display screen;
    a second housing comprising a second display screen;
    a mechanical section operable to connect the first housing and the second housing and switch between a first closed configuration and a second opened configuration, the first closed configuration comprising only the first display screen that is fully exposed, and the second opened configuration comprising the second display screen that is at least partially exposed and the first display screen that is fully exposed;
    a first detection module operable to detect a first detected input on the first display screen;
    a second detection module operable to detect a second detected input on the second display screen;
    a processor operable to:
    when the current configuration is the second opened configuration, then determine when the first detected input and the second detected input are simultaneous;
        when the first detected input and the second detected input are simultaneous, then set the first detected input to a valid first input and the second detected input to a valid second input; and
        when the first detected input and the second detected input are not simultaneous, then
        set the second detected input to an invalid input when the first detected input is detected during the second opened configuration.

2. The mobile electronic device according to claim 1, wherein:
    the processor is further operable to set the invalid input within a predefined period of time after the first detection module detects the first detected input and when the first detected input and the second detected input are not simultaneous.

3. The mobile electronic device according to claim 1, wherein:
    the processor is further operable to set the invalid input within a predefined period of time after the second detection module detects the second detected input and when the first detected input and the second detected input are not simultaneous.

4. The mobile electronic device according to claim 1, further comprising:
    a display control module operable to display a first screen on the first display screen and a second screen on the second display screen when the controller determines that the first detected input and the second detected input are simultaneous.

5. The mobile electronic device according to claim 4, wherein:
    the setting module is further operable to set a third detected input to a valid input and a fourth detected input to a valid input, wherein the third detected input and the fourth detected input are made on the first screen and the second screen respectively.

6. The mobile electronic device according to claim 1, wherein:
    the setting module is further operable to set the first detected input to an invalid input, when the second detection module detects the second detected input, after the first configuration is switched to the second opened configuration.

7. The mobile electronic device according to claim 1, wherein:
the setting module is further operable to set the second detected input detected on the second detection module to an invalid input, when the first detection module detects the first detected input after the first configuration is switched to the second opened configuration.

8. A method for operating a mobile electronic device, the method comprising:
detecting a first detected input on a first display screen;
determining when the mobile electronic device is in an opened configuration such that one of the first display screen and a second display screen is in a fully exposed position and the other of the first display screen and the second display screen is in at least a partially exposed position;
when the mobile electronic device is in the opened configuration, then
detecting a second detected input on a second display screen;
determining when the first detected input is simultaneous with the second detected input;
setting the second detected input to an invalid input, when the first detected input and the second detected input are not simultaneous; and
setting first detected input to a valid first input and the second detected input to a valid second input when the first detected input and the second detected input are simultaneous.

9. The method according to claim 8, further comprising:
setting the first detected input to the invalid input within a predefined period of time after detecting the second detected input and when the first detected input and the second detected input are not simultaneous.

10. The method according to claim 8, further comprising:
setting the second detected input to the invalid input within a predefined period of time after detecting the first detected input and when the first detected input and the second detected input are not simultaneous.

11. The method according to claim 8, further comprising:
displaying a first screen on the first display screen and a second screen on the second display screen when the first detected input and the second detected input are simultaneous.

12. The method according to claim 11, further comprising:
setting a third detected input to a valid input and a fourth detected input to a valid input, wherein the third detected input and the fourth detected input are made on the first screen displayed on the first display screen and the second screen displayed on the second display screen respectively.

13. The method according to claim 8, further comprising:
setting the first detected input to an invalid input when the second detected input is detected while the mobile electronic device is switched from a closed configuration to the opened configuration.

14. The method according to claim 8, further comprising:
setting the second detected input to an invalid input when the first detected input is detected while the mobile electronic device is switched from a closed configuration to the opened configuration.

15. A non-transitory computer readable storage medium comprising computer-executable instructions for operating a mobile electronic device, the method executed by the computer-executable instructions comprising:
detecting a first detected input on a first display screen;
determining when the mobile electronic device is in an opened configuration such that one of the first display screen and a second display screen is in a fully exposed position and the other of the first display screen and the second display screen is in at least a partially exposed position;
when the mobile electronic device is in the opened configuration, then
detecting a second detected input on a second display screen;
determining when the first detected input and the second detected input are simultaneous inputs that occur within a predefined time period of time; and
setting the second detected input to an invalid input, when the first detected input and the second detected input are not simultaneous; and
setting first detected input to a valid first input and the second detected input to a valid second input when the first detected input and the second detected input are simultaneous.

16. The non-transitory computer readable storage medium according to claim 15, the method executed by the computer-executable instructions further comprising:
setting the first detected input to the invalid input after the predefined period of time after detecting the second detected input and when the first detected input and the second detected input are not simultaneous.

17. The non-transitory computer readable storage medium according to claim 15, the method executed by the computer-executable instructions further comprising:
setting the second detected input to the invalid input after the predefined period of time after detecting the first detected input and when the first detected input and the second detected input are not simultaneous.

18. The non-transitory computer readable storage medium according to claim 15, the method executed by the computer-executable instructions further comprising:
displaying a first screen on the first display screen and a second screen on the second display screen when the first detected input and the second detected input are simultaneous.

19. The non-transitory computer readable storage medium according to claim 18, the method executed by the computer-executable instructions further comprising:
setting third detected input to a valid input and a fourth detected input to a valid input, wherein the third detected input and the fourth detected input are made on the first screen displayed on the first display screen and the second screen displayed on the second display screen.

20. The non-transitory computer readable storage medium according to claim 15, the method executed by the computer-executable instructions further comprising:
setting the first detected input to an invalid input, when the second detected input is detected while the mobile electronic device is switched from a closed configuration to the opened configuration.

21. The mobile electronic device of claim 1, further comprising:
a first sensor detecting the first closed configuration; and
a second sensor detecting a third fully opened configuration in which the second display screen is fully exposed,
wherein the setting module is operable to determine that the mechanical section is in a second opened configuration when neither the first sensor detects the first closed configuration nor the second sensor detects the third fully opened configuration.

* * * * *